United States Patent [19]

Turner et al.

[11] 4,056,391

[45] Nov. 1, 1977

[54] METHOD FOR ENHANCING SOLID SOLUTION STABILITY OF ELECTRON ACCEPTOR MOLECULES AND ELECTROPHOTOGRAPHIC COMPOSITIONS

[75] Inventors: Sam R. Turner; John M. Pochan, both of Webster, N.Y.

[73] Assignee: Xerox Corporation, Stamford, Conn.

[21] Appl. No.: 615,665

[22] Filed: Sept. 22, 1975

[51] Int. Cl.$^2$ .................... G03G 5/06; G03G 5/08
[52] U.S. Cl. .................... 96/1 PC; 96/1.5 R; 204/159.15
[58] Field of Search .................... 96/1.5–1.8, 96/1 PC; 252/501; 204/159.15

[56] References Cited

U.S. PATENT DOCUMENTS

| | | | |
|---|---|---|---|
| 3,647,432 | 3/1972 | Holstead | 96/1.6 |
| 3,752,668 | 8/1973 | Baltazzi | 96/1.5 |
| 3,759,807 | 9/1973 | Osborn et al. | 204/159.15 |
| 3,864,126 | 2/1975 | Nishide et al. | 96/1.5 |
| 3,867,140 | 2/1975 | Hashimoto | 96/1.5 |
| 3,994,994 | 11/1976 | Stolka | 96/1.5 X |
| 4,007,043 | 2/1977 | Stolka et al. | 96/1.5 X |
| 4,013,623 | 3/1977 | Turner et al. | 96/1.5 X |
| T884,015 | 3/1971 | Staudenmayer et al. | 96/1.5 |

*Primary Examiner*—Roland E. Martin, Jr.
*Attorney, Agent, or Firm*—James J. Ralabate; James P. O'Sullivan; Ronald L. Lyons

[57] ABSTRACT

Disclosed is a method for enhancing the resistance to crystallization of solid solutions containing electron acceptor molecules. According to this method, electron acceptor molecules are chemically modified whereby the resulting compound is capable of undergoing polymerization. This modified material is thereafter dissolved in a suitable polymeric resin and subsequently exposed to a source of activating energy thereupon causing such modified material to polymerize within the polymeric resin. The resulting composition exhibits enhanced resistance to crystallization and thus is suitable for use in electrophotographic devices and methods.

11 Claims, No Drawings

METHOD FOR ENHANCING SOLID SOLUTION STABILITY OF ELECTRON ACCEPTOR MOLECULES AND ELECTROPHOTOGRAPHIC COMPOSITIONS

BACKGROUND OF THE INVENTION

1. The Field of the Invention

This invention relates to a method, articles prepared by said method and processes for employing these articles. More specifically, this invention is directed toward a method for enhancing the solid solution stability of electron acceptor molecules.

2. Description of the Prior Art

In the electrophotographic arts the photoresponsive component of the imaging member has been traditionally constructed so that one layer of photoconductive material has been primarily responsible for the absorption of imaging energies, the generation of charge carriers in response thereto and the transport of such charge carriers throughout the bulk of the layer. The electronic properties of the materials used in such a layer should be capable of rapid switching from insulating to conductive to insulating state in order to permit cyclic use of the imaging surface of said layer. The failure of a material to return to its relatively insulating state prior to the succeeding charging sequence will result in a decrease in the maximum charge acceptance of the photoconductor. This phenomenon, commonly referred to in the art as "fatigue", has in the past been avoided by the selection of photoconductive materials possessing rapid switching capacity. Typical of the materials suitable for use in such a rapidly cycling imaging system include anthracene, sulfur, selenium and mixtures thereof (U.S. Pat. No. 2,297,691); selenium being preferred because of its superior photosensitivity.

In addition to anthracene, other organic photoconductive materials, most notably poly(N-vinylcarbazole), have been the focus of increasing interest in electrophotography. Most organic photoconductive materials, including poly(N-vinylcarbazole), lack the inherent photosensitivity to be competitive with selenium. This need for enhancement of the photoresponse characteristics of organic photoconductors thus lead to the formulation of these organic materials with other compounds, commonly referred to as "activators". Poly(vinylcarbazoles), for example, when sensitized with 2,4,7-trinitro-9-fluorenone exhibit good photoresponse and discharge characteristics and (depending upon the polarity of the surface charge), low dark decay, U.S. Pat. No. 3,484,237. Ordinarily, the bulk absorption of activating electromagnetic radiation and the consequent generation of charge carriers can and often does result in some trapping of at least one species of charge carrier within the photoconductive layer and thus some impairment in the cycling characteristics of the imaging member. This disadvantage is also present where the absorption of imaging energies and the generation of charge carriers is performed by one component of a binder layer (hereinafter functionally designated as the "charge carrier generating material") and the transport of charge carriers through the bulk of said layer by a second chemically distinct component (hereinafter referred to as "electronically active matrix material"), U.S. Pat. No. 3,121,007 and U.K. Pat. No. 1,343,671.

In order to avoid the cycling limitations often inherent in such single layered systems, it has been proposed that the functions of (a) charge carrier generation (resulting from photoactivation) and (b) charge carrier transport can be performed more satisfactorily — (with respect to cycling) - where each of these two separate functions is performed by separate but contiguous layers (U.K. Pat. No. 1,337,228 and Can. 932,199). In these multi-layered configurations absorption of imaging energies and generation of charge carriers is exclusively limited to the layer of charge carrier generating materials. Substantial absorption and photogeneration of charge carriers within the bulk of the charge carrier transport layer can reportedly impair the cycling characteristics of this type of composite and thus is to be avoided. In U.K. Patent 1,337,228 the transport layer is capable of facile transport of either holes or electrons which are injected into it from the layer of light-absorbing charge carrier generating materials contiguous therewith. In Can. Patent 932,199 the charge carrier transport layer is capable of facile transport of electrons injected into it from a contiguous layer of light-absorbing charge carrier generating material. Neither patent specifically discloses a polymer having an electron acceptor moiety capable of satisfactory performance in such a transport layer. The Canadian patent does, however, indicate that such polymers can be expected to perform in a manner equivalent to binder layers containing electron acceptor materials.

Monomers having relatively weak electron acceptor groups pendant therefrom are disclosed in U.S. Pat. No. 3,418,116 and U.S. Pat. No. 3,697,264. In each instance these monomers are copolymerized with a second monomer having pendant therefrom a relatively strong electron donor group. The resulting polymers reportedly are photoconductive due to the charge transfer interaction between adjacent pendant groups having differing electron affinities.

Attempts to prepare monomers having relatively strong electron acceptor groups (groups having an electron affinity in excess of about 0.7 electron volts) have been generally unsuccessful. This fact is borne out by the relatively few disclosures of strong electron acceptor functional monomers reported in the technical literature.

Ordinarily, the preparation of copolymers having strong electron acceptor groups appended from their backbone is beset with a number of difficulties. Due to the strong electron affinity of such pendant groups, it is virtually impossible to initiate polymerization of such monomers by free-radical techniques, since the electron acceptor moiety quenches the free radical prior to substantial polymerization of the monomer. This problem has led to attempts at introducing electron withdrawing substituents on groups pendant from a preformed polymer which does not already inherently possess strong electron acceptor properties. This approach also encounters serious synthesis hurdles since attempts at, for example, nitration of poly(vinylfluorenone) results in degradation of the polymer and reduction in its solubility in common solvents (presumably due to crosslinking).

In both U.K. 1,337,228 and Can. 932,199 discussed previously, it was indicated that electron acceptor systems can be prepared by dispersing and/or dissolving a nonpolymeric electron acceptor in a suitable binder and casting or coating this composition as a film on a layer of charge carrier generating materials. In terms of long term cycling stability, such binder system transport layers are not equivalent to transport layers prepared from polymers. Such binder layers can at best be described as metastable, undergoing a progressive decline in their electronic properties. Such instability is believed to be due in part to the tendency of such non-polymeric materials to migrate within the polymeric binder and thereby cause phase separation due to crystallization. In certain instances, such nonpolymeric materials can diffuse out of the polymeric binder, thereby rendering the charge carrier transport layer electronically inert. In the event of either occurrence, such binder layer transport layers would be precluded from use in a composite photoconductive layer requiring repeated cycling of this imaging member over an extended period of time, since the electronic properties of the imaging member would not be capable of remaining within the machine specifications for such a device. The electron transport layer configuration of the multi-layered photoconductor referred to in U.K. 1,337,228 and Can. 932,199 is superior to the hole transport layer system in that the electron transport system is relatively insensitive to oxidative degradation and unlike the hole transport analog, is capable of maintaining more stable electronic performance, thus, prolonging its useful lifetime within an electrophotographic reproduction system.

Accordingly, it is the object of this invention to remedy the above as well as related deficiencies in the prior art.

More specifically, it is the primary object of this invention to provide a method for enhancing the stability of solid solutions containing electron acceptor molecules.

It is another object of this invention to provide composite photoconductive insulating films wherein one layer of said film comprises a stabilized solid solution containing an electron acceptor molecule.

It is yet another object of this invention to provide a composite photoconductive insulating film wherein one layer of said film contains electron acceptor molecules which are attached to one another through a series of chemical linkages.

Additional objects of this invention include the use of the above composite photoconductive insulating films in electrophotographic devices and methods.

SUMMARY OF THE INVENTION

The above and related objects of this invention are achieved by providing a solid solution containing a polymeric resin and at least 25 weight percent of at least one compound of the formula

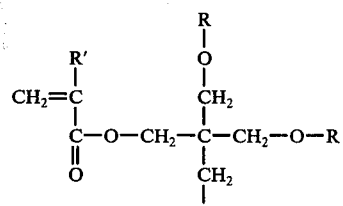

wherein R is

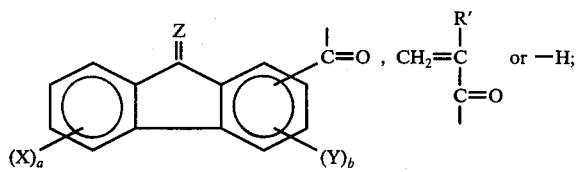

R' is hydrogen or methyl;
X and Y are independently selected from the group consisting of $-NO_2$, halogen, cyano and $-CF_3$;
Z is oxygen or dicyanomethylene; and
$a$ and $b$ can range from 0 to 3;
with the proviso that at least one of R is

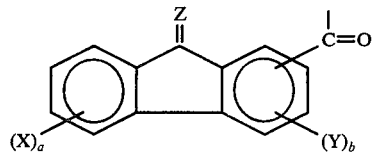

This solid solution is thereafter subjected to a source of energy sufficient to cause at least some of the compounds to polymerize within the polymeric resin. The degree and efficiency to which such polymerization is achieved is dependent upon the source of energy used to initiate such polymerization and the duration of exposure of the solid solution to such energy. Energy sources which are especially preferred for initiating the polymerization of the above compounds include ultraviolet radiation and electron beam bombardment.

DESCRIPTION OF THE INVENTION INCLUDING PREFERRED EMBODIMENTS

The electron acceptor compounds suitable for use in this method can be readily prepared by reacting mono-, di- or tri-esters of acrylic acid or methacrylic acid and pentaerythritol with an acid chloride derivative of fluorenone or the 9-dicyanomethylene analogue of fluorenone. Electron acceptor compounds prepared in the manner described above, can be combined with phase compatible saturated polymeric resins, phase compatible unsaturated polymeric resins or formed independent of such polymeric resins into films and coatings. These films and/or coatings containing the electron acceptor compounds can then be subjected to exposure to sufficient energy to initiate polymerization of these compounds with one another and, under the appropriate conditions, with the polymeric resin within which they are dissolved. Where such electron acceptor compounds are polymerized in the presence of phase compatible saturated polymeric resins, the resulting product will be an interpenetrating polymer network having two distinct polymeric phases, each of which is phase compatible with the other without chemical interaction therebetween. Where such electron acceptor compounds are polymerized in the presence of an unsaturated polymeric resin, the resulting product will comprise polymeric chains of electron acceptor engrafted onto the polymeric resin. Concurrently, the electron acceptor compounds will polymerize with one another thereby resulting in a solid solution containing both electron acceptor polymers and electron acceptor polymers engrafted onto the polymeric resin backbone. Phase compatibility between these distinct polymeric materials is preferably maintained and thus electronic performance remains unimpaired. Where such coatings are formed from electron acceptor compounds independent of a polymeric resin, the exposure to an appropriate energy source will also result in extensive polymerization of the electron acceptor compounds with one another.

The source of energy used to initiate the interpolymerization of the electronic acceptor compounds among themselves and with other materials in solid solution can be either thermal and/or electromagnetic radiation of the appropriate wavelength and/or electron beam bombardment at the appropriate frequency. The duration and intensity of exposure of the solid solution to such energy is dependent upon the degree of polymerization of the electron acceptor compound desired. Extensive polymerization, will, of course, result in modification of the physical properties of the polymeric resin within which the electron acceptor compounds are dissolved. The method and extent of exposure of the solid solution to the energy source used in initiation of polymerization of the electron acceptor compound should not be of the type or of a magnitude sufficient to cause degradation of the polymeric resin within which the electron acceptor compound is dissolved. In order to increase the efficiency with which such polymerization takes place, it is preferably to include within the solid solution an initiator compound which is also sensitive to the source of energy used to initiate polymerization. Such initiator must, of course, be selected with the ultimate electronic performance of the solid solution in mind. Preferably, such initiator materials should be electronically compatible with the ultimate utility of the solid solution. For example, such initiator compounds should not provide deep trapping of the majority specie of charge carrier in order for the cycling characteristics of the solid solution to remain intact. Representative of free radical initiator compounds which are compatible with the electronic objectives of these solid solutions include free radical type initiators such as the peroxides, azobisisobutyronitrile, and certain persulfates.

The polymeric resins which are suitable for use in combination with the electron acceptor compounds in formation of solid solutions include both the saturated and unsaturated polymers which are phase compatible with these materials. Phase compatibility is defined in terms of the relative concentration of electron acceptor compounds which can be dissolved within the polymeric resin without cyrstallization or phase separation of the respective materials of the composition. Where one defines phase compatibility of such solid solutions in the context of electrophotographic performance, such systems require that the polymeric resin be capable of dissolving sufficient electron acceptor compounds for transport of electrons throughout the bulk of the solid solution. Ordinarily, the minimum concentration of electron acceptor compounds in such polymeric resins generally necessary to independently achieve satisfactory transport of electrons throughout the bulk of this composition is approximately 25 percent by weight.

The polymeric resins within which electron acceptor compounds can be dissolved are described as either electronically "inert" or electronically "active"; electronic inertness or activity being descriptive of the relative ability of the polymer to effectively generate charge carriers in response to electromagnetic radiation within the spectral range commonly employed in electrophotography and/or transport charge carriers which are injected into its bulk from another source. Representative of electronically "inert" polymeric resins which are suitable as the solid solution matrix include the polyolefins, the polyesters, the polycarbonates, cellulose esters, the polysiloxanes, the polyurethanes, copolymers, blends and mixtures thereof. Electronically "active" polymers which are also suitable for use as the solid solution matrix include many of the photoconductive polymers, such as poly(N-vinylcarbazole), poly(2-vinylcarbazole), poly(3-vinylcarbazole), poly(vinylpyrene), poly (2-anthryl methacrylate) and poly(9-vinylanthracene).

Ordinarily, the dispersal of electron acceptor compounds within electronically active polymer matrices will result in charge transfer interaction between these compounds and the carbocyclic/heterocyclic constituent of the electronically active polymer. This resultant charge transfer complex will generally be highly colored and thus render the solid solution photoresponsive in the visible region of the electromagnetic spectrum. Charge transfer complexes can also be formed in electronically inert polymer matrix where such matrix contains other dissolved/dispersed materials (monomeric and/or polymeric) capable of charge transfer interaction with the electron acceptor compounds. Nonpolymeric materials capable of formation of charge transfer complexes with electron acceptor compounds described hereinabove include many of the Lewis bases (e.g. N-alkyl carbazoles, naphthalene, anthracene and pyrene). The photoactivation of the charge transfer complex concurrent with the irradiation of the solid solution containing such complex will often contribute toward initiation of polymerization of the electron acceptor compound.

In a preferred embodiment of this invention, solid solutions of electronically inert polymeric resin and electron acceptor compounds are used in composite photoconductive insulating layers of the type described in Canadian Patent No. 932,199 (which is hereby incorporated by reference). In the preparation of composite photoconductive insulating films, an insulating layer comprising a solid solution of the type described herein above is initially prepared and a thin layer of photoconductive materials subsequently deposited thereupon. The free surface of the layer of photoconductive materials can then be further overcoated with a conductive metal layer. The relative order of the insulating layer and layer of photoconductive materials can be reversed with respect to their arrangement vis-a-vis the conductive metal layer.

In a typical composite photoconductive insulating layer of the type referred to hereinabove, the photoconductive layer can range in thickness from about 0.02 to about 20 microns and the charge carrier transport layer range in thickness from about 5 to about 100 microns; the ratio of thickness of the photoconductive layer to the transport layer being in the range from about 1:2 to about 1:200.

The photoconductive materials of the photoconductive layer used in such composite photoconductive insulating films are preferably photoresponsive in the visible region of the electromagnetic spectrum and must be sufficiently electronically compatible with the charge carrier transport layer to enable injection of charge carriers from the layer of photoconductive materials into the transport layer containing the electron acceptor compounds. Photoconductive materials which satisfy the above requirements include phthalocyanine pigments, trigonal selenium and amorphous selenium. The composite photoconductive insulating films need not, in all instances, be permanently associated with a conductive substrate but such association may be had only during latent image formation and thereafter the insulating film disassociated from said substrate whereupon the latent image on its surface can be developed and therefter transferred to a sheet of untreated paper. The latent image formation step is then repeated.

The Examples which follow further define, describe and illustrate the preparation and use of the solid solutions in electrophotographic imaging members and methods. Techniques and apparatus used in preparation and evaluation of these materials and the imaging members containing said materials are standard or as hereinbefore described. Parts and percentages appearing in such Examples are by weight unless otherwise indicated.

EXAMPLE I

Preparation of triacrylpentaerythritol-4,5,7-trinitrofluorenone-2-carboxylate Fluorene is initially reacted with acetic anhydride in the presence of aluminum chloride thereby forming 2-acetyl fluorene, as per J. Org. Chem. 35: 8 2765 (1970). 2-Acetyl fluorene is thereafter oxidized to fluorenone-2-carboxylic acid in the following manner (as per Organic Synthesis, Coll. Vol. III, p. 240). A 5 liter 3-necked round bottom flask, equipped with a magnetic stirring bar, reflux condenser and addition funnel is charged with 50 grams of 2-acetyl fluorene and 650 milliliters of glacial acetic acid. This solution is warmed sufficiently until the 2-acetyl fluorene is dissolved in the glacial acetic acid. A total of about 450 grams sodium dichromate is slowly added to the solution over a period of about 60 minutes. After such addition is complete, the mixture is heated to boiling under reflux and 200 milliliters of acetic anhydride introduced into the reaction vessel through the addition funnel over a period of about 90 minutes. Heating under reflux conditions is continued overnight. The following morning, the hot solution is poured into 9 liters of hot water, stirred for 50 minutes and then filtered through a Buchner funnel. The filter cake is washed with four 400 milliliter portions of 2 percent sulfuric acid. The yellow product remaining in the funnel is thereafter transferred to a 4 liter beaker containing 700 milliliters of 5 percent potassium hydroxide. This mixture is stirred and heated for about 20 minutes on a steam bath. When the temperature of the mixture reaches 70° C, it is filtered. The insoluble material is subsequently treated with several 50 milliliter portions of hot 5 percent potassium hydroxide. The filtrates are collected and combined, treated with a few grams of activated charcoal and filtered. The filtered solution is then heated to a temperature in the range of from between 65 to 70° C with vigorous agitation and 200 milliliters of 18 percent hydrochloric acid added by dropwise addition. A thick yellow voluminous precipitate is formed which is heated for an additional 15 minutes at 85° C. After filtration, the product is again washed with five 200 milliliter portions of hot water and air dried overnight. Further drying is accomplished by vacuum treatment at 100° C for 16 hours. Yield 25.1 grams bright yellow crystals of fluorenone-2-carboxylic acid.

The fluorenone-2-carboxylic acid is thereafter nitrated in the conventional manner with a mixture of fuming nitric acid and concentrated sulfuric acid. The nitrated product is recovered and purified in the conventional manner. Analysis of this product indicates it to be 4,5,7-trinitro-9-fluorenone-2-carboxylic acid. This product is subsequently contacted with thionyl chloride thereby producing 4,5,7-trinitro-9-fluorenone-2-carboxylic acid chloride.

About 3 grams ($8.95 \times 10^{-3}$ moles) of 4,5,7-trinitrofluorenone-2-carboxylic acid chloride is dissolved in 15 milliliters of tetrahydrofuran and about 0.9 grams triethylamine added to the solution. About 2.65 grams ($8.95 \times 10^{-3}$ moles) pentaerythritoltriacrylate is subsequently added to the above solution with stirring and the materials thereafter allowed to react for 2 hours. During this time, a precipitate forms which is subsequently separated from solution by filtration. The solution is thereafter evaporated to dryness at 35° C on a rotary evaporator. The solids which remain are taken up in methylene chloride and extracted with water for removal of residual traces of triethylamine hydrochloride. The hydrated product is extracted with several portions of methylene chloride. The methylene chloride solution is thereafter dried over magnesium sulfate, filtered and again evaporated to dryness on a rotary evaporator. The product obtained is a tan solid whose structure is confirmed to be the desired product by infrared and NMR analysis.

EXAMPLE II

The procedures of Example I are repeated except for the substitution of the diacrylate of pentaerythritol for the triacrylate of pentaerythritol.

EXAMPLE III

The procedures of Example I are repeated except for the substitution of the monoacrylate of pentaerythritol for the triacrylate of pentaerythritrol.

EXAMPLE IV

About 10 parts by weight triacrylpentaerythritol-4,5,7-trinitrofluorenone-2-carboxylate and 10 parts by weight polycarbonate resin (Lexan 145, G. E. Corporation) are dissolved in a common solvent and the resulting solution drawbar coated on a thin layer (0.5 microns) of amorphous selenium which has been previously vacuum deposited on an aluminized Mylar substrate. The amount of solution transferred to the selenium layer is sufficient to form a dry film having a thickness of approximately 15 microns. After removal of solvent residues from this film, the film is uniformly subjected to bombardment from a 10 Kilovolts electron beam for approximately 90 seconds. The electrophotographic performance of the imaging member prepared in the manner described above is evaluated by initially sensitizing the free surface of the solid solution layer by charging to a positive potential of approximately 1000 volts. An image pattern is thereafter projected onto the imaging member with white light and the sensitizing charge selectively dissipated in the light-struck areas. The latent image thus produced is developed with negatively charged thermoplastic toner particles and the toner image subsequently transferred to a sheet of untreated paper where it is permanently affixed by thermal fusion. The free surface of the composite photoconductive insulating layer is thereafter wiped with a cotton cloth for removal of toner residues and the reproduction cycle repeated. Copy quality is acceptable and is reproducible.

EXAMPLE V

The procedures of Example IV are repeated except for the substitution of ultraviolet light for the electron beam. Ultraviolet light illumination is provided by an Osram high pressure mercury lamp (Model HBO 100W-2, available from Macbeth Corporation, Newburgh, New York). The lamp distance from the sample is approximately 10 centimeters for at least five minutes. The duration of exposure would, of course, vary depending on sample thickness and the extent of polymerization desired of the electron acceptor compound.

EXAMPLE VI

The procedures of Example V are repeated except for the substitution of microwave energy for ultraviolet light.

EXAMPLE VII

The procedures of Example VI are repeated except for the substitution of infrared radiation for microwave irradiation.

What is claimed is:

1. A method for enhancing the resistance of solid solutions containing electron acceptor molecules to phase separation, said method comprising:

a. providing a solid solution containing a polymeric resin and at least 25 weight percent of at least one compound of the formula $$CH_2=C\begin{matrix}R'\\|\\C-O-CH_2-C-CH_2-O-R\\\|\\O\end{matrix}\begin{matrix}R\\|\\O\\|\\CH_2\\|\\CH_2\\|\\O\\|\\R\end{matrix}$$

wherein R is $$\begin{matrix}Z\\\|\\C=O\end{matrix} \text{ or } CH_2=C\begin{matrix}R'\\|\\C=O\\|\end{matrix}$$

R' is hydrogen or methyl;
X and Y are independently selected from the group consisting of —NO$_2$, halogen, cyano and —CF$_3$;
Z is oxygen or dicyanomethylene; and
a and b can range from 0 to 3; with the proviso that at least one of R is $$\begin{matrix}Z\\\|\\C=O\end{matrix}$$

b. exposing said solid solution to sufficient thermal energy, electromagnetic radiation and/or electron beam bombardment to effect polymerization of the electron acceptor compounds within the solid solution.

2. The method of claim 1 wherein the polymeric resin of the solid solution is a saturated polymeric resin.

3. The method of claim 1 wherein the polymeric resin of the solid solution is an unsaturated polymeric resin.

4. The method of claim 1 wherein the solid solution contains an initiator compound which readily breaks down to form free radicals in response to exposure to the polymerization energies.

5. The method of claim 1 wherein the energy used to initiate polymerization of the electron acceptor compound is thermal energy.

6. The method of claim 1 wherein the energy source used to initiate polymerization of the electron acceptor compound is electromagnetic radiation.

7. The method of claim 1 wherein the energy source used to initiate polymerization of electron acceptor compound is an electron beam.

8. An electrophotographic imaging member comprising a photoconductive insulating layer which comprises a solid solution of a polymeric resin and at least 25 weight percent of at least one compound of the formula $$CH_2=C\begin{matrix}R'\\|\\C-O-CH_2-C-CH_2-O-R\\\|\\O\end{matrix}\begin{matrix}R\\|\\O\\|\\CH_2\\|\\CH_2\\|\\O\\|\\R\end{matrix}$$

wherein R is $$\begin{matrix}Z\\\|\\C=O\end{matrix} \text{ or } CH_2=C\begin{matrix}R'\\|\\C=O\\|\end{matrix}$$

R' is hydrogen or methyl;
X and Y are independently selected from the group consisting of —NO$_2$, halogen, cyano and —CF$_3$;
Z is oxygen or dicyanomethylene; and
a and b can range from 0 to 3;
with the proviso that at least one of R is $$\begin{matrix}Z\\\|\\C=O\end{matrix}$$

said electron acceptor compound having been exposed to a sufficient thermal energy, electromagnetic radiation and/or electron beam bombardment to effect polymerization of said compound within the solid solution.

9. In an electrophotographic imaging process comprising the steps of providing an electrophotographic imaging member having a photoconductive insulating layer and forming a latent image on the surface of said photoconductive insulating layer, the improvement comprising;

an electrophotographic imaging member comprising a photoconductive insulating layer which comprises a solid solution of a polymeric resin and at least 25 weight percent of at least one compound of the formula

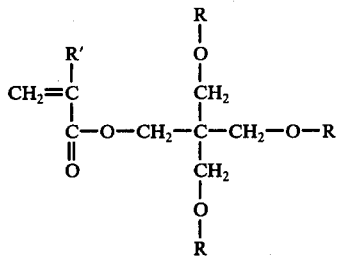

wherein R is

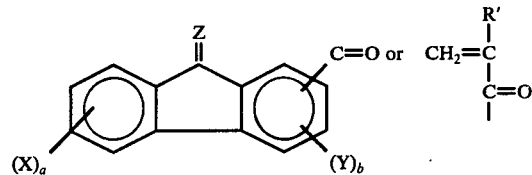

R' is hydrogen or methyl;
X and Y are independently selected from the group consisting of —NO$_2$, halogen, cyano and —CF$_3$;
Z is oxygen or dicyanomethylene; and
a and b can range from 0 to 3;
with the proviso that at least one of R is

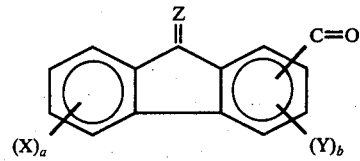

said electron acceptor compound having been exposed to a sufficient thermal energy, electromagnetic radiation and/or electron beam bombardment to effect polymerization of said compounds within the solid solution.

10. A method for enhancing the resistance of solid solutions containing electron acceptor molecule to phase separation, said method comprising:
 a. providing an electron acceptor compound which has been previously chemically modified by the attachment thereto of an acrylate or methacrylate substituent;
 b. dissolving at least 25 weight percent of said chemically modified electron acceptor in a phase compatible polymeric resin thereby forming a solid solution; and
 c. subjecting said solid solution to sufficient thermal energy, electromagnetic radiation and/or electron beam bombardment to effect polymerization of the chemically modified electron acceptor compound.

11. The method of claim 1 wherein the solid solution also contains a free radical initiator compound which readily decomposes to form free radicals in response to exposure to polymerization energies.

* * * * *